United States Patent
Hopf et al.

(10) Patent No.: US 7,746,085 B2
(45) Date of Patent: Jun. 29, 2010

(54) MICROMECHANICAL SENSOR HAVING AN ANALYZER CIRCUIT

(75) Inventors: Gerald Hopf, Reutlingen (DE); Oliver Kohn, Reutlingen (DE); Thomas Walker, Kusterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 11/040,539

(22) Filed: Jan. 20, 2005

(65) Prior Publication Data
US 2005/0160831 A1 Jul. 28, 2005

(30) Foreign Application Priority Data
Jan. 22, 2004 (DE) .................... 10 2004 003 181

(51) Int. Cl.
*G01R 27/26* (2006.01)
(52) U.S. Cl. .................. 324/658; 324/661; 324/691; 73/504.12; 340/669
(58) Field of Classification Search ................ 324/658, 324/679, 686, 661, 672; 702/141
See application file for complete search history.

(56) References Cited

U.S. PATENT DOCUMENTS

| | | | | |
|---|---|---|---|---|
| 4,709,146 A | * | 11/1987 | Reitsema | 250/231.14 |
| 5,365,768 A | * | 11/1994 | Suzuki et al. | 73/1.01 |
| 5,461,319 A | * | 10/1995 | Peters | 324/660 |
| 5,511,420 A | | 4/1996 | Zhao et al. | |
| 5,540,095 A | * | 7/1996 | Sherman et al. | 73/514.18 |
| 5,831,164 A | * | 11/1998 | Reddi et al. | 73/514.01 |
| 6,952,966 B2 | * | 10/2005 | Itakura | 73/514.32 |
| 2005/0126288 A1 | * | 6/2005 | Gahn et al. | 73/504.12 |
| 2005/0210978 A1 | * | 9/2005 | Lang et al. | 73/504.12 |

FOREIGN PATENT DOCUMENTS

| | | |
|---|---|---|
| DE | 10059775 | 6/2002 |
| DE | 10255690 | 6/2003 |
| JP | 2004-279261 | * 7/2004 |

OTHER PUBLICATIONS

Rodjegard et al., "A differential charge-transfer readout circuit for multiple output capacitive sensors" Sensors and Actuators A, V. 119, (2005), p. 309-315.*

* cited by examiner

*Primary Examiner*—Thomas Valone
(74) *Attorney, Agent, or Firm*—Kenyon & Kenyon LLP

(57) ABSTRACT

A micromechanical sensor having an analyzer circuit and at least two detecting elements, each of the two detecting elements being connected to the analyzer circuit by at least one signal line. At least one signal line is connected to both detecting elements.

6 Claims, 2 Drawing Sheets

MICROMECHANICAL SENSOR HAVING AN ANALYZER CIRCUIT

BACKGROUND INFORMATION

Micromechanical sensors according to the prior art have a certain number of signal lines per sensor unit, these lines connecting the actual pickup to an electronic analyzer. With advances in integration, multiple pickups are integrated into one micromechanical sensor to form a multichannel sensor, for example, or to perform a plausibility check on the results. The number of signal lines is many times greater here. Due to the further miniaturization of micromechanical function elements, the areas for connections such as signal lines and bond pads are taking up a growing amount of the total substrate surface area of a micromechanical sensor.

SUMMARY OF THE INVENTION

The present invention is directed to a micromechanical sensor having an analyzer circuit and at least two detecting elements, each of the two detecting elements being connected to the analyzer circuit by at least one signal line. The core of the present invention is that at least one signal line is connected to the two detecting elements.

It is advantageous here that, through the joint use of signal lines, there is a savings in terms of the substrate surface area of the micromechanical sensor for these lines and for unneeded bond pads.

In a preferred embodiment of the present invention, each of the two detecting elements is constructed so that the measured value is represented in the form of a differential capacitance. The capacitive measuring method, in particular the measurement of differential capacitances, is a standard measurement method in micromechanical sensors. Four signal lines to the electronic analyzer are needed for one detecting element. In integrating additional detecting elements into the micromechanical sensor, the result is a considerable potential savings in terms of signal lines.

According to another embodiment of the present invention, the analyzer circuit is provided on a first substrate and at least two detecting elements are provided on a second substrate, and the first and second substrates are connected by a signal line.

Such a signal line is known as a substrate line. It connects the substrates of the detecting element and the analyzer circuit to one another. It is advantageous here that the detecting elements are situated on a common substrate because a joint substrate line may then be provided from the detecting elements to the analyzer circuit.

According to a particularly advantageous embodiment of the present invention, when there are N detecting elements the sensor has N+3 signal lines. In the case of a pickup having four signal lines, as in the example of the pickup according to the principle of differential capacitance and when all the detecting elements are situated on a common substrate and the analyzer device is situated on another substrate, N+3 is the smallest possible number of signal lines for connecting N detecting elements to the analyzer device.

According to another embodiment of the present invention, the analyzer circuit is provided on a first substrate, the first detecting element is provided on a second substrate and at least the second detecting element is provided on a third substrate. The first and second substrates are then interconnected by a first signal line, and the first and third substrate are interconnected by a second signal line. It is advantageous here that individual pickups situated on their own substrates are provided in any desired location in the micromechanical sensor and may be connected to the analyzer device.

According to another advantageous embodiment of the present invention, when there are N detecting elements the sensor has 2N+2 signal lines. In the case of a pickup having four signal lines as in the example of the pickup according to the principle of differential capacitance and when each detecting element is provided on its own substrate and the analyzer device is situated on another substrate, then 2N+2 is the smallest possible number of signal lines for connecting N detecting elements to the analyzer device. However, the N detecting elements may also be situated on a joint substrate and each may nevertheless have its own substrate line for connecting to the analyzer device in order to avoid the effects of residual capacitance on the substrate, for example. Again in this case, 2N+2 is the smallest possible number of signal lines for connecting N detecting elements to the analyzer device.

DETAILED DESCRIPTION

The present invention will be described in greater detail on the basis of the exemplary embodiments described below.

Figure 1:
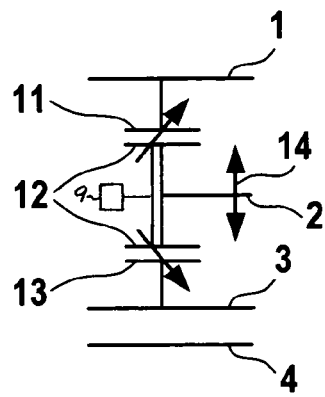
FIG. 1 shows schematically the capacitive detecting element of a micromechanical sensor according to the prior art.

FIG. 1 shows schematically a capacitive detecting element of a micromechanical sensor according to the prior art. The detecting element operates according to the principle of differential capacitance. A first electrode 11 is stationary and opposite a second electrode 12 that is movable. Opposing electrodes 11, 12 together form a capacitor having a variable plate spacing. Movable electrode 12 together with another stationary electrode 13 forms a second capacitor having a variable plate spacing. Movable electrode 12 is attached to a seismic mass 9. Deflections in the seismic mass along direction 14 result in measurable changes in capacitance between electrodes 11, 12 and 12, 13. The detecting element described here is connected to an analyzer circuit by four signal lines. Signal line 1 is connected to stationary electrode 11, signal line 2 is connected to movable electrode 12 and signal line 3 is connected to stationary electrode 13. Signal line 4 is known as a substrate line, connecting the substrate of the detecting element to the analyzer circuit.

Figure 2:
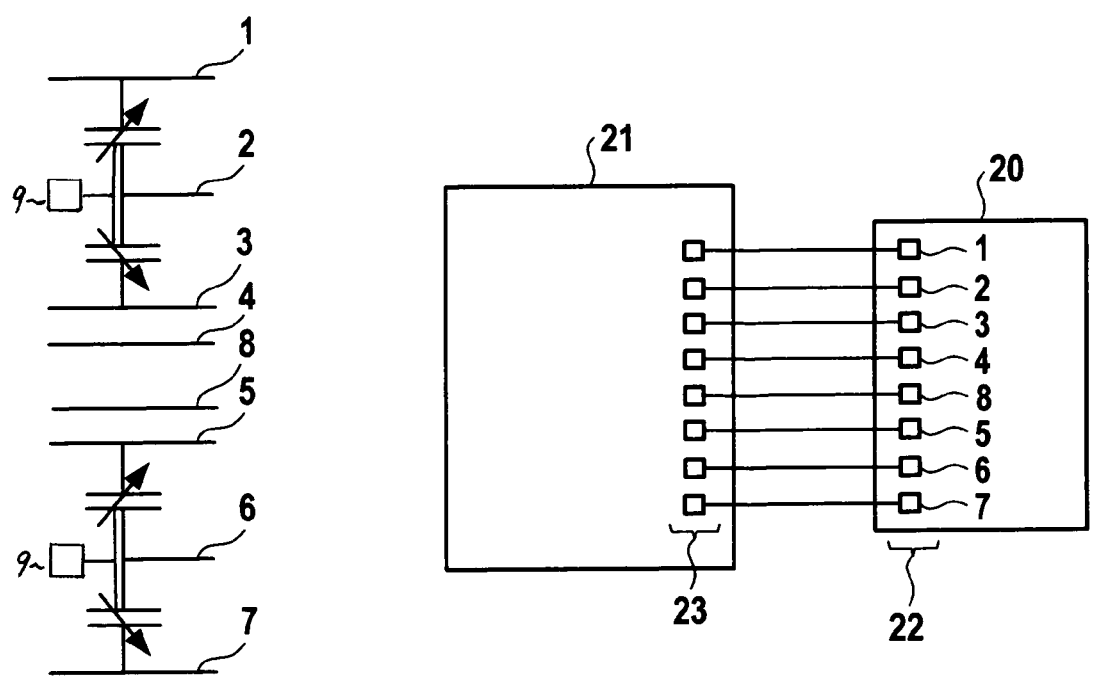
FIG. 2 shows schematically a micromechanical sensor according to the prior art having two capacitive detecting elements.

FIG. 2 shows a micromechanical sensor having two capacitive detecting elements according to the prior art. The micromechanical sensor in this example has a micromechanical measuring unit 20 and an electronic analyzer device 21. Measuring unit 20 includes two capacitive detecting elements (not shown here). The first detecting element has signal lines 1 through 4 and the second detecting element has signal lines 5 through 8. These signal lines are connected to electronic analyzer device 21 via contacting surfaces (bond pads) 22 and 23. In contrast with a single-channel sensor, a two-channel sensor has twice as many signal lines. Signal lines 1 through 8 and sixteen bond pads 22, 23 take up a considerable amount of the chip surface area of detecting element 20 and analyzer device 21.

Figure 3:
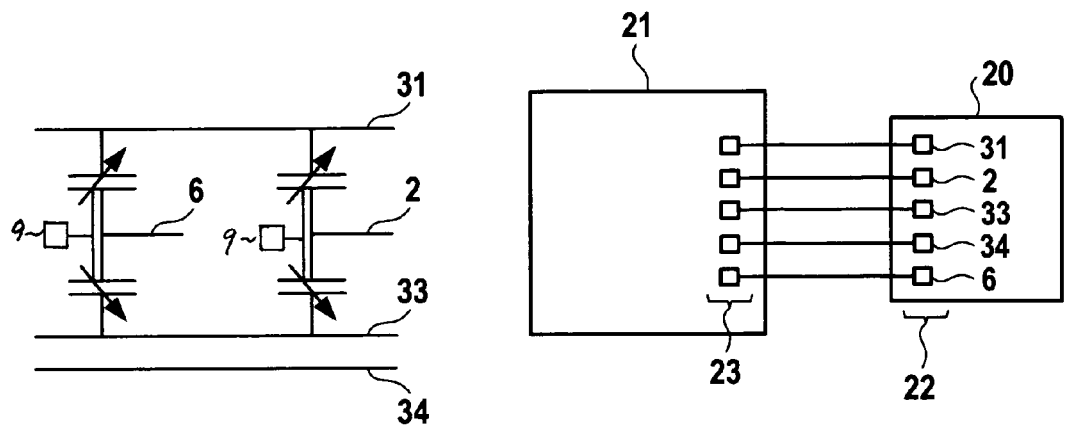
FIG. 3 shows a micromechanical sensor according to the present invention having two capacitive detecting elements and five signal lines.

FIG. 3 shows a first embodiment of a micromechanical sensor according to the present invention having two capacitive detecting elements. Former signal lines 1 and 5 now together form a single signal line 31. Former signal lines 3 and 7 now together form joint signal line 33. In addition, former substrate lines 4 and 8 now form joint substrate line 34. On the whole, only five signal lines 2, 6, 31, 33, 34 and ten bond pads 22, 23 are provided through the circuitry of the two capacitive detecting elements according to the present invention to connect micromechanical measuring unit 20 to electronic analyzer device 21.

Figure 4:
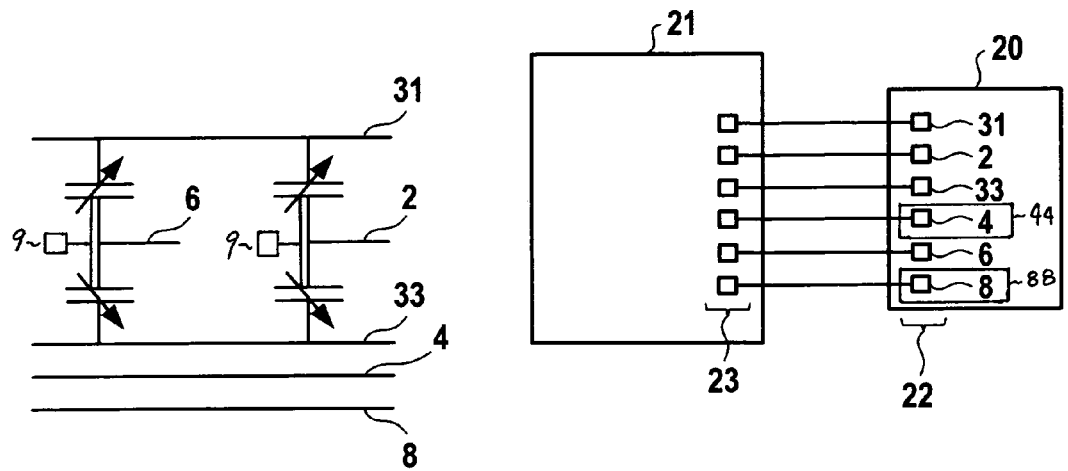
FIG. 4 shows another embodiment of the micromechanical sensor according to the present invention having two capacitive detecting elements and six signal lines.

FIG. 4 shows another embodiment of a micromechanical sensor according to the present invention having two capacitive detecting elements. However, in contrast with the exemplary embodiment described in conjunction with FIG. 3, substrate lines 4 and 8 of the two capacitive detecting elements are still carried separately in this embodiment, as in the related art. This embodiment may be expedient when the detecting elements are on different substrates (e.g., as shown schematically by elements 44 and 88) or when influences on the measurement due to residual capacitances are to be prevented. In this example, micromechanical measuring unit 20 and electronic analyzer device 21 are interconnected by six signal lines 2, 4, 6, 8, 31, 33 and twelve bond pads 22, 23.

What is claimed is:

1. A micromechanical sensor comprising:
   an electronic analyzer device;
   at least two detecting elements separate from the analyzer device, wherein each of the two detecting elements includes a moveable electrode, a first stationary electrode and a second stationary electrode;
   a first shared signal line connected to the first stationary electrode of each of the at least two detecting elements, the first shared signal line connecting the detecting elements in parallel to a plurality of bond pads on the analyzer device; and
   a second shared signal line connected to the second stationary electrode of each of the at least two detecting elements, the second shared signal line connecting the detecting elements in parallel to the bond pads on the analyzer device;
   wherein each moveable electrode is connected to the analyzer device by a dedicated, separate signal line.

2. The micromechanical sensor according to claim 1, wherein each of the two detecting elements is constructed so that a measured value is represented in the form of a differential capacitance.

3. The micromechanical sensor according to claim 1, further comprising first and second substrates, the analyzer device being situated on the first substrate and the at least two detecting elements being situated on the second substrate, and the first and second substrates being connected by a further signal line.

4. The micromechanical sensor according to claim 1, wherein there are N detecting elements and N+3 signal lines.

5. The micromechanical sensor according to claim 1, further comprising first, second and third substrates, as well as first and second substrate lines, and wherein:
   the analyzer device is situated on the first substrate,
   a first of the detecting elements is situated on the second substrate,
   at least a second of the detecting elements is situated on the third substrate, and
   the first and second substrates are connected by the first substrate line, and the first and third substrates are connected by the second substrate line.

6. The micromechanical sensor according to claim 1, wherein there are N detecting elements and 2N+2 signal lines.

* * * * *